W. E. LAMB.
DRIVING MECHANISM FOR MOTOR VEHICLES.
APPLICATION FILED SEPT. 12, 1916.

1,282,598. Patented Oct. 22, 1918.

Inventor
W. E. Lamb

Witnesses

Attorneys

UNITED STATES PATENT OFFICE.

WILLIAM E. LAMB, OF BURR OAK, KANSAS.

DRIVING MECHANISM FOR MOTOR-VEHICLES.

1,282,528.

Specification of Letters Patent.   Patented Oct. 22, 1918.

Application filed September 12, 1916.   Serial No. 118,758.

*To all whom it may concern:*

Be it known that I, WILLIAM E. LAMB, a citizen of the United States, residing at Burr Oak, in the county of Jewel, State of Kansas, have invented certain new and useful Improvements in Driving Mechanism for Motor-Vehicles; and I do hereby declare the following to be a full, clear, and exact description of the invention, such as will enable others skilled in the art to which it appertains to make and use the same.

The present invention is directed to improvements in driving mechanism for motor vehicles, and has for its object to provide a device of this character so constructed that the front and rear wheels of the automobile can be driven for propelling the vehicle.

A further object of the invention is to provide a novel form of connection between the driven axle and the wheels.

A still further object of the invention is to provide a novel form of connection between the spindles of the front wheels so that the same can be propelled and shifted for guiding the vehicle.

With these and other objects in view, this invention resides in the novel features of construction, formation, combination and arrangement of parts to be hereinafter more fully described, claimed and illustrated in the accompanying drawing in which:—

Figure 1:
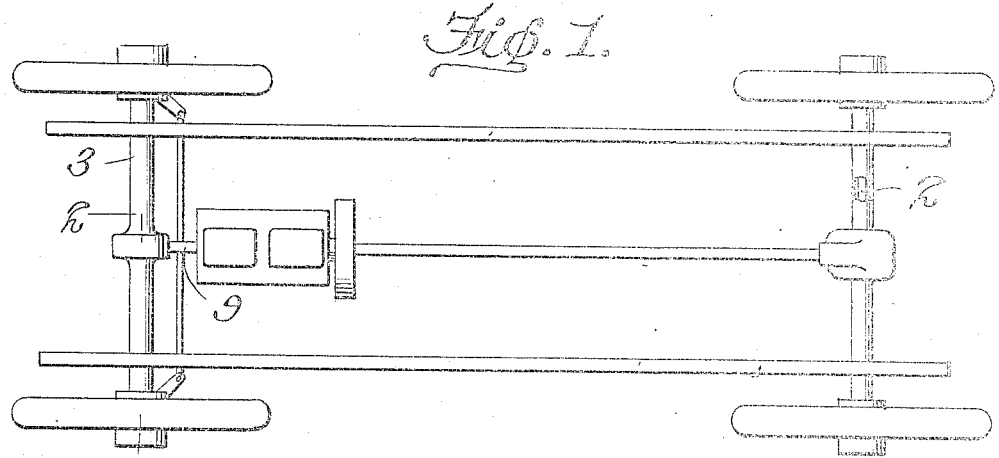
Figure 1 is a plan view of the running-gear of an automobile showing the same equipped in accordance with the invention.
Figure 2:
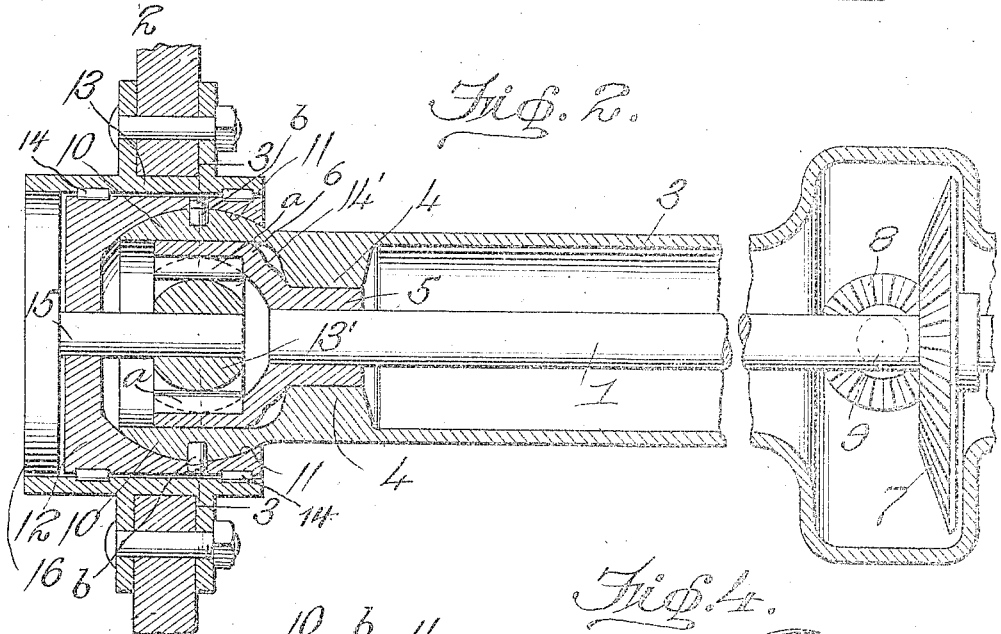
Fig. 2 is a sectional view on line 2—2 of Fig. 1.
Figures 3, 4:
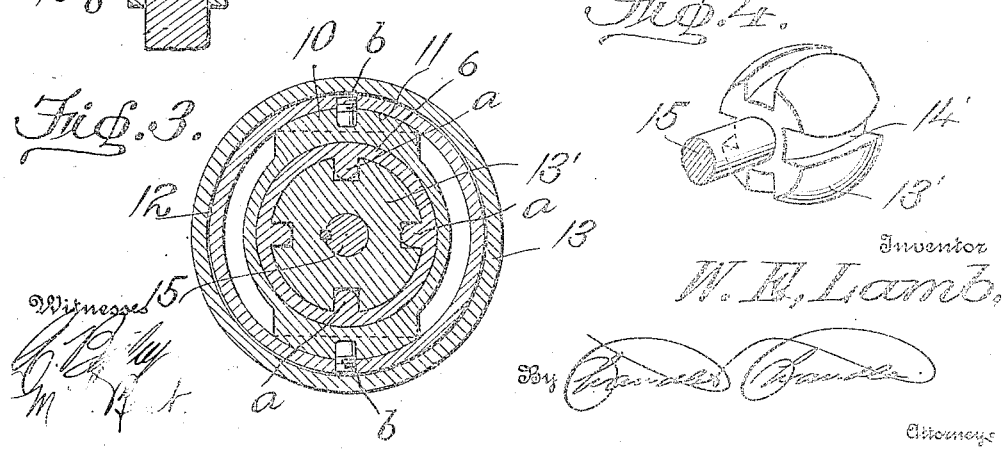
Fig. 3 is a similar view on line 3—3 of Fig. 1.
Fig. 4 is a detail perspective view of the coupling head.

Referring to the drawing in detail, 1 designates the front driven axle, and 2 the rear driven axle of an automobile, and since the mechanism for driving the front and rear wheels are identical, the description of one will suffice for both, as hereinafter set forth.

The axle 1 is inclosed in the stationary axle 3 which forms a casing therefor, having an interior bearing 4 in which is journaled the reduced end 5 of a cylindrical cup member 6 formed with internal diametrically opposed teeth $a$, the cup member 6 being secured to the driven axle 1 in any suitable manner.

On the axle 1 is fixed a beveled gear 7 which meshes with a beveled pinion 8 secured to the driving shaft 9 adapted to be operated as usual from a motor.

Formed on the outer end of the stationary axle 3 are diametrically opposed semi-circular shaped enlargements 10 which are received in a substantially spherical shaped socket 11 formed in a turning spindle 12 which is engaged over the outer end of the stationary axle and has mounted therein at diametrically opposite points vertical pivots $b$ which are engaged in the enlargements 10 for swingingly connecting the spindle 12 to the stationary axle 3 to permit the horizontal turning of the spindle on the pivots $b$ as will be clearly apparent.

Surrounding the spindle 12 is the hub 13 of the vehicle wheel while interposed between the said hub and the spindle are suitable anti-friction bearings 14 to minimize wear and friction between these parts. Journaled centrally in the spindle 12 is a stud spindle 15 which is carried by a cap 16 secured in the outer end of the hub 13 of the vehicle wheel and in this manner the latter is rotatably supported upon the swinging spindle 12. The stud spindle 15 being centrally located in the spindle 12 extends through the socket 11 into the cup member 6 and has fixed thereon a spherical or ball head 18' having formed exteriorly therein diametrically opposed arcuate shaped grooves or channels 14' receiving the teeth $a$ interiorly of the cup member 6 and in this manner the stud spindle 15 has universal joint connection with the driven axle 1 so that motion from the latter will be imparted directly to the vehicle wheel for rotating the same.

The swinging spindles 12 can be turned on the pivots $b$ through the medium of any suitable steering mechanism for the guiding of the vehicle wheel.

The drive for the rear axle differs from that of the front axle only in that the conventional form of differential gearing is used for driving said rear axle 2.

In the operation of the driving mechanism the axle 1 transfers its motion to the stud spindle 15 which is coupled with said axle and is fixed in the hub 13 of the vehicle wheel so that the latter will be rotated. When the spindle 12 is turned on the pivots

*b* engaging the enlargements 10 on the stationary axle 3 the wheel can be turned for the guiding of the vehicle.

What is claimed is:—

In combination, a driven axle, a stationary axle inclosing the driven axle and having a bearing interiorly thereof, a cup member journaled in the bearing and fixed to the driven axle, diametrically opposed internal teeth in the cup member, a spindle pivoted for swinging movement on the stationary axle, a wheel hub journaled on the spindle, a stud spindle journaled centrally in the first named spindle and fixed in the hub, and an exteriorly grooved spherical head fixed to the stud spindle and meshing with the internal teeth in the cup member.

In testimony whereof, I affix my signature, in the presence of two witnesses.

WILLIAM E. LAMB.

Witnesses:
N. M. FAIR,
R. L. DECKER.